United States Patent
Mirza et al.

(10) Patent No.: US 9,897,813 B2
(45) Date of Patent: Feb. 20, 2018

(54) OCULAR VISION SYSTEM WITH OPTICAL GUIDE THAT CAN BE POSITIONED IN TWO POSITIONS

(71) Applicant: OPTINVENT, Rennes (FR)

(72) Inventors: Kayvan Mirza, Rennes (FR); Piero Sallen, Rennes (FR); Pascal Benoit, Rennes (FR)

(73) Assignee: OPTINVENT, Rennes (FR)

( * ) Notice: Subject to any disclaimer, the term of this patent is extended or adjusted under 35 U.S.C. 154(b) by 0 days.

(21) Appl. No.: 14/894,608

(22) PCT Filed: May 28, 2014

(86) PCT No.: PCT/EP2014/061061
§ 371 (c)(1),
(2) Date: Nov. 30, 2015

(87) PCT Pub. No.: WO2014/191460
PCT Pub. Date: Dec. 4, 2014

(65) Prior Publication Data
US 2016/0103325 A1 Apr. 14, 2016

(30) Foreign Application Priority Data

May 31, 2013 (FR) ...................................... 13 54975
Jul. 24, 2013 (FR) ...................................... 13 57294

(51) Int. Cl.
| | |
|---|---|
| *H04N 7/00* | (2011.01) |
| *G02C 1/00* | (2006.01) |
| *G03H 1/00* | (2006.01) |
| *G02B 27/01* | (2006.01) |
| *G02C 5/12* | (2006.01) |
| *G02C 11/00* | (2006.01) |
| *G06F 3/01* | (2006.01) |
| *G06T 19/00* | (2011.01) |
| *H04N 5/225* | (2006.01) |

(52) U.S. Cl.
CPC ..... *G02B 27/0179* (2013.01); *G02B 27/0172* (2013.01); *G02B 27/0176* (2013.01);
(Continued)

(58) Field of Classification Search
USPC ..... 348/115; 359/13–14, 432, 618, 629–633, 359/638–640, 808, 809; 351/158
See application file for complete search history.

(56) References Cited

U.S. PATENT DOCUMENTS

2006/0119539 A1* 6/2006 Kato ............... G02B 27/0176
345/8
2006/0245175 A1 11/2006 Heine et al.
(Continued)

FOREIGN PATENT DOCUMENTS

DE 10 2006 001505 A1 7/2007
DE 20 2012 003317 U1 7/2012
(Continued)

OTHER PUBLICATIONS

Jul. 31, 2014 Search Report issued in International Patent Application No. PCT/EP2014/061061.

*Primary Examiner* — Trung Diep
(74) *Attorney, Agent, or Firm* — Oliff PLC; R. Brian Drozd

(57) ABSTRACT

An ocular vision system with a display module, which includes a transparent optical guide, is adapted for propagating, by total internal reflections, a light beam transporting an image as far as an extraction section of the optical guide. The system may include: means for positioning the optical guide in a first position in which the extraction zone is placed along a first axis corresponding to a nominal axis of sight of the user's eye; means for positioning the optical guide in a second position in which the extraction zone is placed along a second axis offset with respect to the nominal axis of sight of the user's eye; and means for rotating the optical guide about an axis intended to pass substantially through the center of rotation of the user's eye, enabling the optical guide to pass from the first position to the second position and vice versa.

17 Claims, 7 Drawing Sheets

Figure 1:
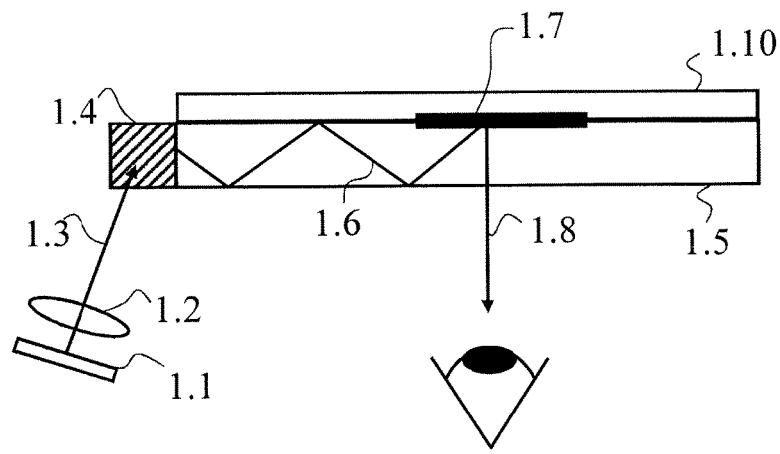

(52) U.S. Cl.
CPC .............. *G02C 5/124* (2013.01); *G02C 11/10* (2013.01); *G06F 3/017* (2013.01); *G06T 19/006* (2013.01); *H04N 5/2253* (2013.01); *G02B 2027/0138* (2013.01); *G02B 2027/0158* (2013.01); *G02B 2027/0159* (2013.01); *G02B 2027/0178* (2013.01)

(56) References Cited

U.S. PATENT DOCUMENTS

| | | | |
|---|---|---|---|
| 2009/0243966 A1* | 10/2009 | Kato | G02B 27/017 345/8 |
| 2010/0063997 A1* | 3/2010 | Sako | G06F 17/30038 709/203 |
| 2010/0103078 A1* | 4/2010 | Mukawa | G02B 27/0172 345/8 |
| 2011/0043616 A1* | 2/2011 | Dobbie | G02B 27/017 348/62 |
| 2012/0069448 A1* | 3/2012 | Sugihara | G02B 27/0176 359/643 |
| 2012/0147317 A1* | 6/2012 | Loeb, Jr. | G02C 5/124 351/55 |

FOREIGN PATENT DOCUMENTS

| | | |
|---|---|---|
| EP | 2 290 427 A1 | 3/2011 |
| FR | 2 925 172 B1 | 8/2010 |
| WO | 2012/136470 A1 | 10/2012 |

\* cited by examiner

OCULAR VISION SYSTEM WITH OPTICAL GUIDE THAT CAN BE POSITIONED IN TWO POSITIONS

The present invention relates to the field of ocular vision systems based on optical guides. Such optical guides enable an image to be transported without deformation and thus enable superimposing this transported image on an external scene perceived by the eye of the user of the ocular vision system. The present invention also relates to the field of such ocular vision systems further equipped with an image capture device.

An optical guide generally comprises an injection system, thanks to which the light beam transporting an image is introduced. The light beam transporting the image issues from a source that may be a matrix of pixels of the LCD (liquid crystal display) or LCOS (liquid crystal on silicon) type illuminated by a light source, or of the OLED (organic light-emitting diode) type. The light beam next passes through an optical system for obtaining a collimated beam, meaning wherein the rays are substantially parallel. It is also said that the image is thus borne to infinity. The collimated beam is then introduced into the injection section of the optical guide.

The optical guide enables the light beam to propagate by total internal reflections, optionally thanks to a specific treatment of the walls of the optical guide. The light beam thus propagates are far as an extraction section for the light beam to emerge from the optical guide. The extraction section may consist of a reflector terminating the optical guide in an inclined plane.

The patent FR 2 925 172 B1 describes an optical guide provided with an extraction section consisting of reflective microstructures formed on the surface of the optical guide. These microstructures consist of prisms having an angle enabling the light beam to emerge from the optical guide. The microstructures are spaced apart by interstitial spaces formed in line with the surface of the optical guide. These interstitial spaces, meaning not covered with microstructures and fitting between the latter, are transparent and thus enable obtaining the see-through effect. This allows seeing the image transported by the light beam as well as the scenes beyond the optical guide. These interstitial spaces do however imply a phenomenon of variation of luminance on the transparency of the optical guide, which causes interferences on the vision of the surrounding scenes through the optical guide.

An improvement for limiting the interferences perceived both on the injected image and on the vision through the optical guide was proposed by the international patent application WO 2012/136470 A1.

Such optical guides are for example used in ocular vision systems. There exist applications where it is desirable for a user of the ocular vision system to be able to superimpose the image transported by the optical guide on the external scene, such as for example augmented reality applications. The transported image must then be in the nominal axis of sight of the eye of the user. Nominal axis of sight of the eye means the axis passing through the centre of the eye and through the centre of the pupil of the eye when the user is looking straight in front of him (meaning the nominal axis of sight of the eye is the horizontal when the user is holding his head straight). There exist applications, of the dashboard type, where it is desirable for the user to be able to have access to the image transported by the optical guide without obstructing this nominal axis of sight. It is desirable to be able to use an ocular vision system for these two applications, and to be able to switch from one to the other of these applications without having to adjust the optical settings of the ocular vision system.

In particular in the context of augmented-reality applications, the ocular vision system may be equipped with an image capture device, such as a video camera or a photographic apparatus. One difficulty posed by this type of ocular vision system is that a person facing whom the wearer of the ocular vision system is situated cannot be sure that he is not being filmed or photographed unbeknown to him/her. It is also desirable to overcome this drawback of the prior art.

The invention concerns an ocular vision system intended to be worn by a user, said system comprising a display module, the display module comprising a transparent optical guide adapted for propagating, by total internal reflections, a light beam transporting an image for an extraction section of said optical guide. Said system comprises: means for positioning the optical guide in a first position in which the extraction zone is placed along a first axis corresponding to a nominal axis of sight of the eye of the user; means for positioning the optical guide in a second position in which the extraction zone is placed along a second axis offset with respect to the nominal axis of sight of the eye of the user; and means for rotating the optical guide about an axis intended to pass substantially through the centre of rotation of the eye of the user, adapted for enabling the optical guide to pass from the first position to the second position and vice versa. Thus it is possible to use the ocular vision system in two modes: a first mode where the extraction section of the optical guide is in the nominal axis of sight of the eye of the user, and which is then suitable for augmented-reality applications; a second mode where the extraction section of the optical guide is offset from the nominal axis of sight of the eye of the user, and which is then suitable for applications of the dashboard type. The rotation about an axis passing substantially through the centre of the eye ensures correct positioning of the eye box created by the optical guide in both of these modes. It should be noted that several positions, offset from the nominal axis of sight of the eye of the user, of the optical guide could be suitable for applications of the dashboard type. Thus the ocular vision system may comprise means for positioning the optical guide in more than two positions by rotation about an axis passing substantially through the centre of the eye, each enabling the user to view the image transported by the optical guide.

According to a particular embodiment, the second axis is offset by 20° with respect to the nominal axis of sight of the eye of the user. Thus the nominal axis of sight of the eye of the user can be left clear from the presence of the optical guide while keeping a suitable eye box.

According to a particular embodiment, said system being spectacles, the display module being fixed to one of the sidepieces of said spectacles, said system further comprises means for adjusting a nose pad of said spectacles for height. Thus it is easy to make a vertical adjustment of the eye box created by the optical guide, an adjustment made for either said first position or said second position being valid for the other position.

According to a particular embodiment, said height-adjustment means comprise a knurled wheel and means for converting a rotation movement of the knurled wheel into a translation movement of the nose pad. Thus the adjustment for height can be carried out finely.

According to a particular embodiment, said height-adjustment means comprise a rack composed of notches, each of the notches defining a predefined height of the nose pad. Thus the adjustment for height is simple to implement.

According to a particular embodiment, said system being spectacles, the display module being fixed to one of the sidepieces of said spectacles, said system further comprises a battery fixed to the other sidepiece of said spectacles. Thus the weight of the ocular vision system is distributed, which increases the comfort of use.

According to a particular embodiment, in order to rotate the optical guide between the first position and the second position about a rotation axis intended to pass substantially through the centre of rotation of the eye of the user, said system comprises: a stud holder that comprising at least one stud; a fixing and guiding support comprising at least one oblong groove intended to receive said stud, each groove being such that, when said stud is placed at one end of said groove, the optical guide is in the first position and when said stud is placed at the other end of said groove the optical guide is in the second position; and a spring for providing engagement of each stud in a said corresponding oblong groove. Thus the system for fixing and rotating the display module is reliable and compact.

According to a particular embodiment, each oblong groove comprises at each of its ends a blind hole adapted for receiving one said corresponding stud under the action of said spring. Thus the holding in position of the optical guide in the first position or in the second position is improved.

According to a particular embodiment, said system further comprises an operating button fixed to the stud holder and adapted for countering the action of the spring in order to disengage each stud from the corresponding oblong groove. Thus it is easy to mount or remove the display module.

According to a particular embodiment, said system comprises a housing in which a recess is formed, the recess being intended to receive the stud holder and the fixing and guiding support, the mouth of the opening comprising, at one point, a larger part to enable inserting the stud holder and the spring in said housing. Thus it is easy to assemble the rotation mechanism.

According to a particular embodiment, an image capture device is mounted securely on the display module so that the axis of sight of said image capture device is parallel to the axis of sight of the user when the user is looking through the optical guide. Thus the axis of sight of the image capture device makes a rotation at the same time and of the same magnitude as the optical guide. Then, when the user is facing a person, placing the optical guide in the second position means that the images of the person can no longer be taken, which minimises privacy issues.

According to a particular embodiment, said system comprises at least one position sensor for detecting when the optical guide is in the first position and/or when the optical guide is in the second position.

According to a particular embodiment, said system comprises at least one indicator light associated with said position sensor or sensors, a first state of which represents the optical guide in the first position and a second state of which represents the optical guide in the second position. Thus a person facing the user can easily know whether the image capture device enables taking pictures of said person unbeknown to him/her.

According to a particular embodiment, said system comprises communication means adapted for transmitting to a server images captured with said image capture device and information representing the position of the optical guide detected by said sensor or sensors and for receiving from the server the image to be transported by the optical guide. Thus the server can apply different processing operations to the received images, depending on the position in which the optical guide is situated (and consequently according to the position in which the image capture device is situated).

According to a particular embodiment, said image capture device being a video camera, said server is adapted for: applying processing for applying augmented reality to the images received from the ocular vision system, when the optical guide is in the first position; and applying processing for applying gesture recognition to the images received from the ocular vision system, when the optical guide is in the second position.

According to a particular embodiment, said system comprises supplementary rotation means adapted for enabling, when the optical guide is in the first position, adjusting the extraction zone horizontally with respect to the nominal axis of sight of the eye of the user. Thus said system can easily adapt to bending tolerances of a spectacle frame on which said system is mounted and/or dimension tolerances of said frame and/or a greater variety of inter-pupil distances.

Figure 2A:
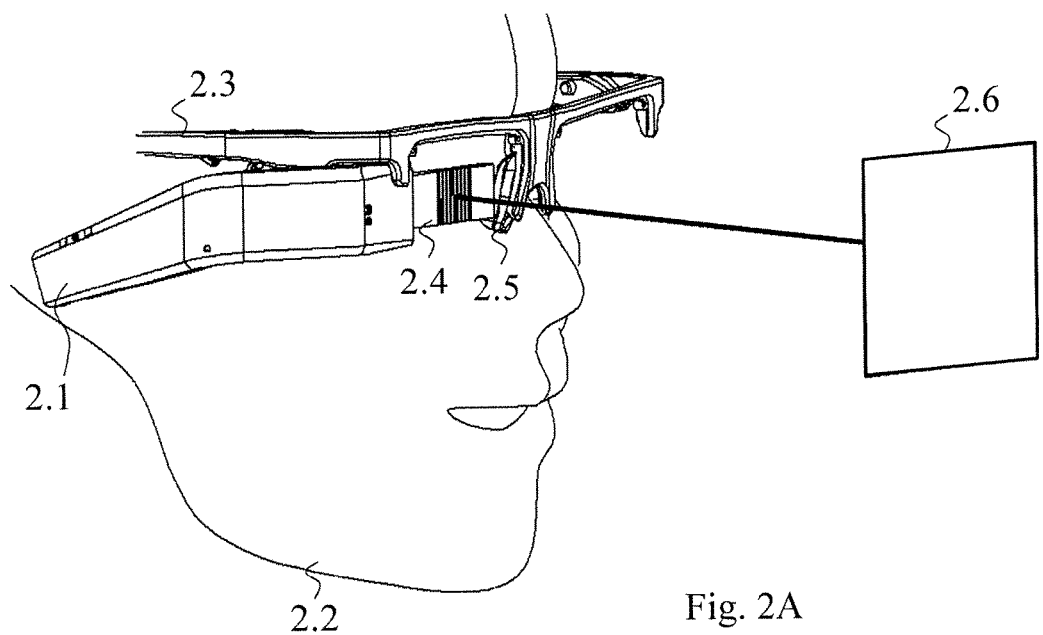
Figure 2B:
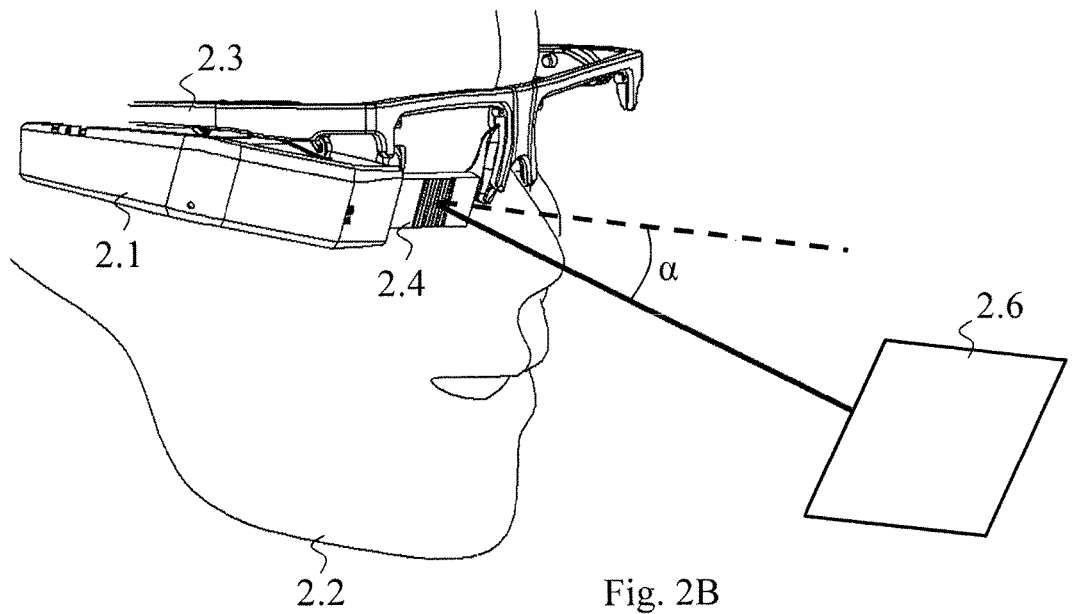
Figures 3A, 3B:
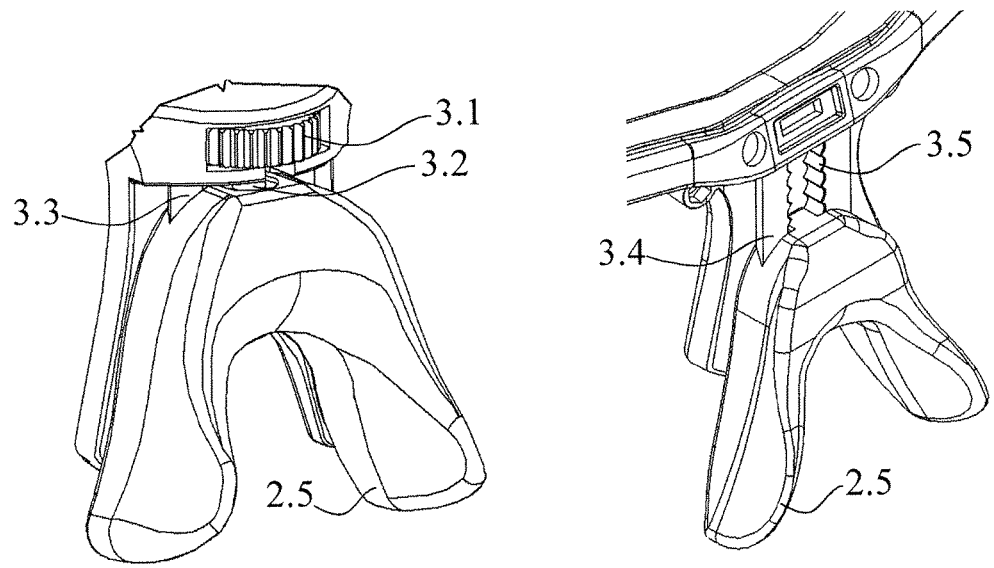
Figure 4A:
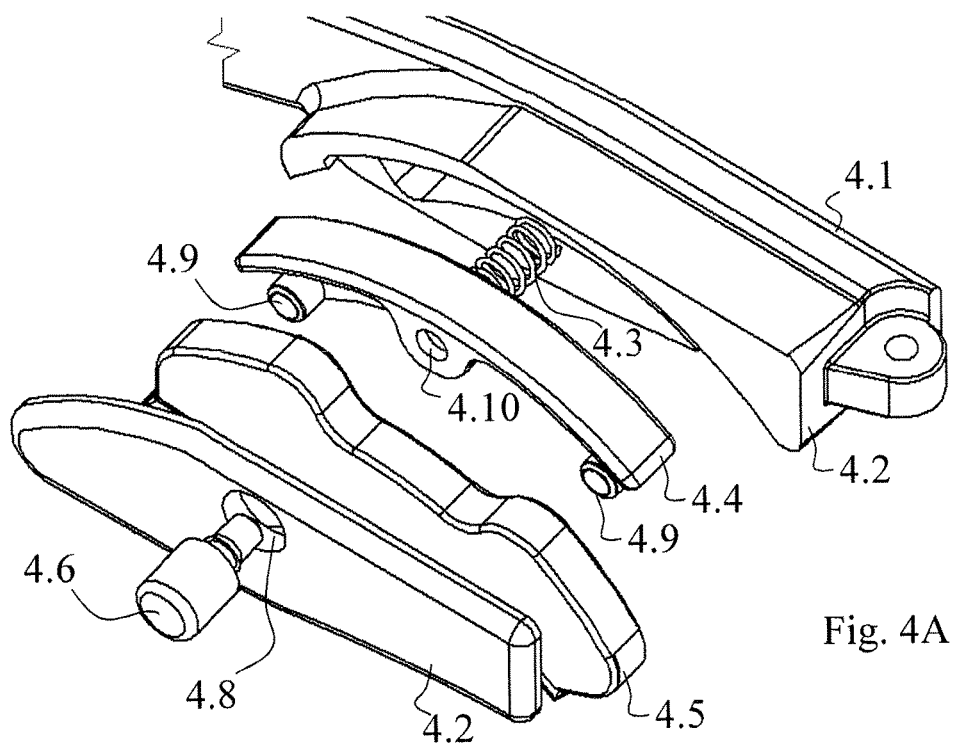
Figure 4B:
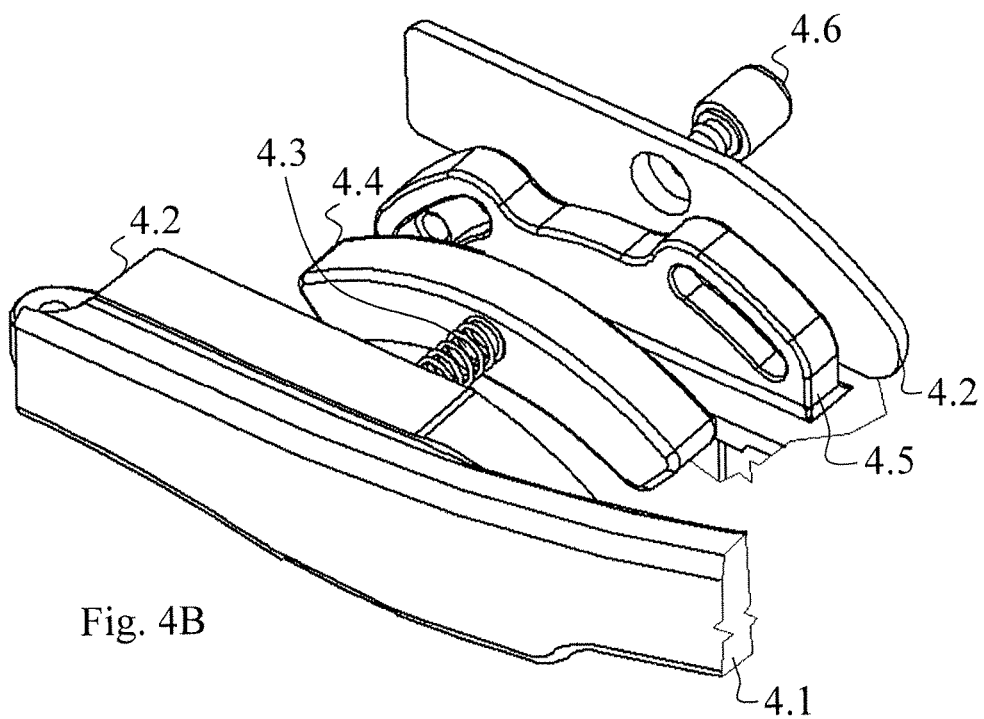
Figure 5A:
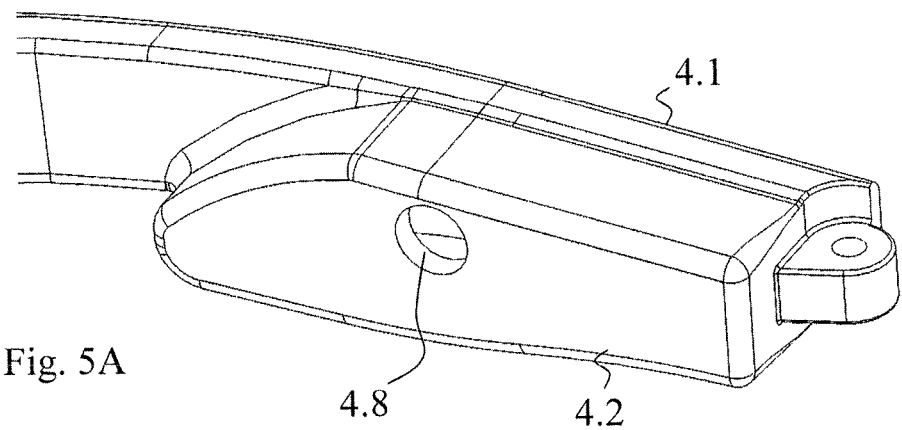
Figure 5B:
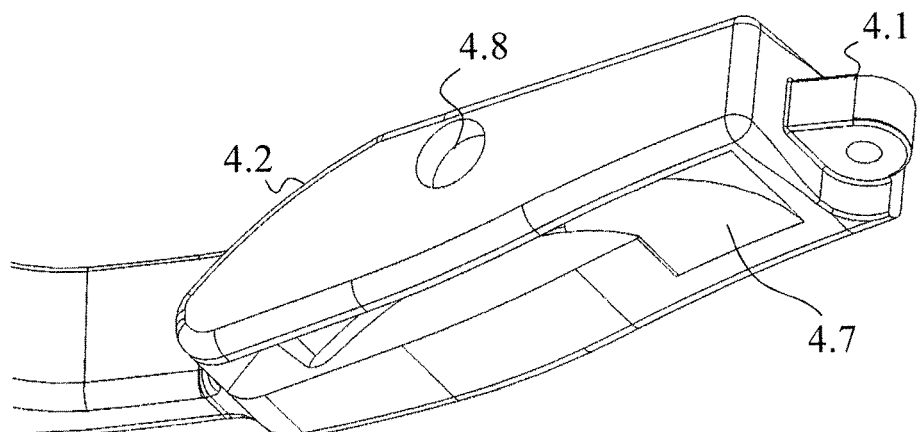
Figure 6:
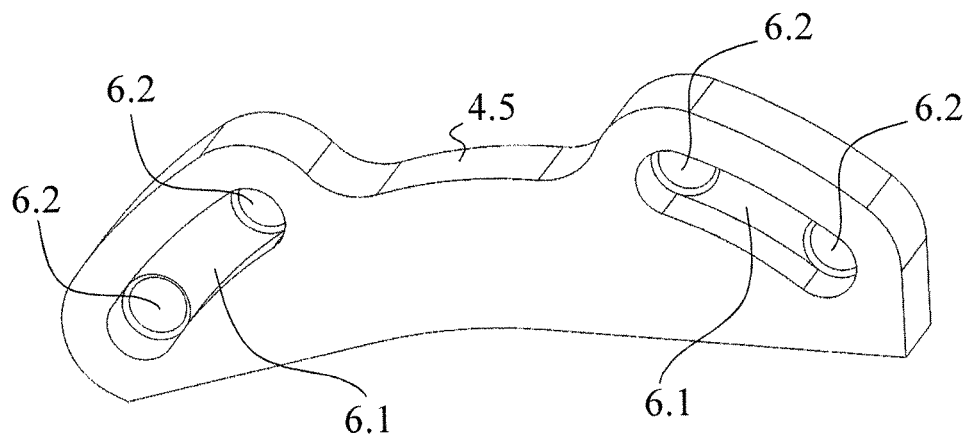
Figure 7A:
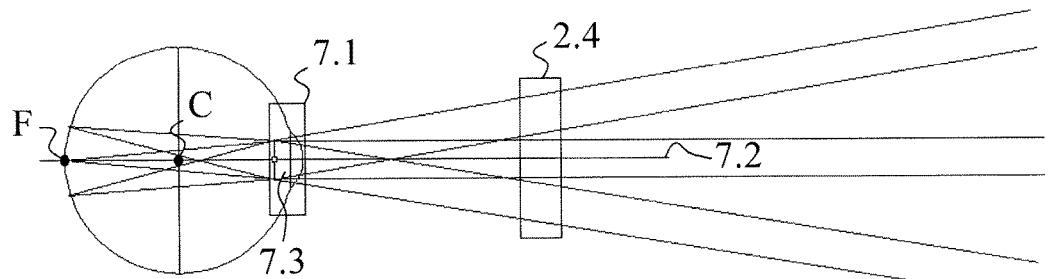
Figure 7B:
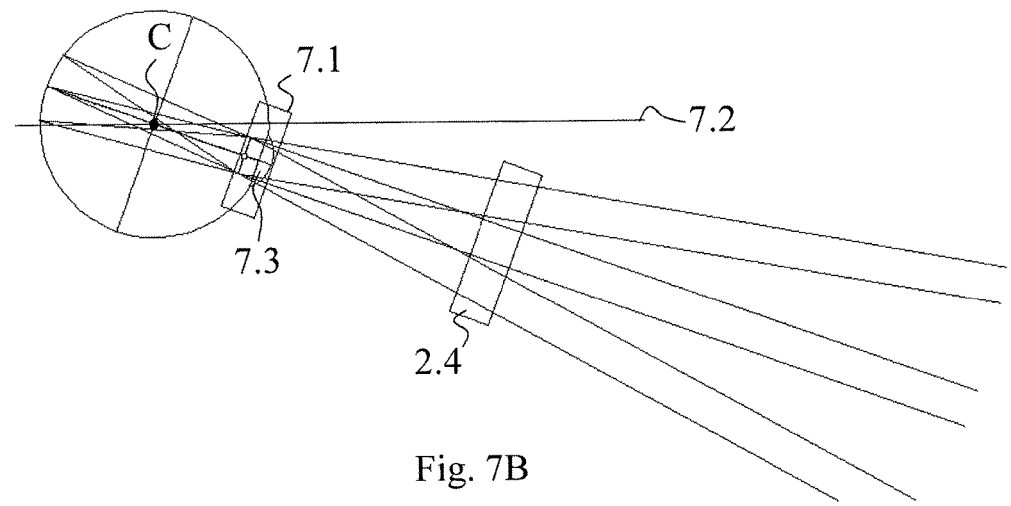
Figure 7C:
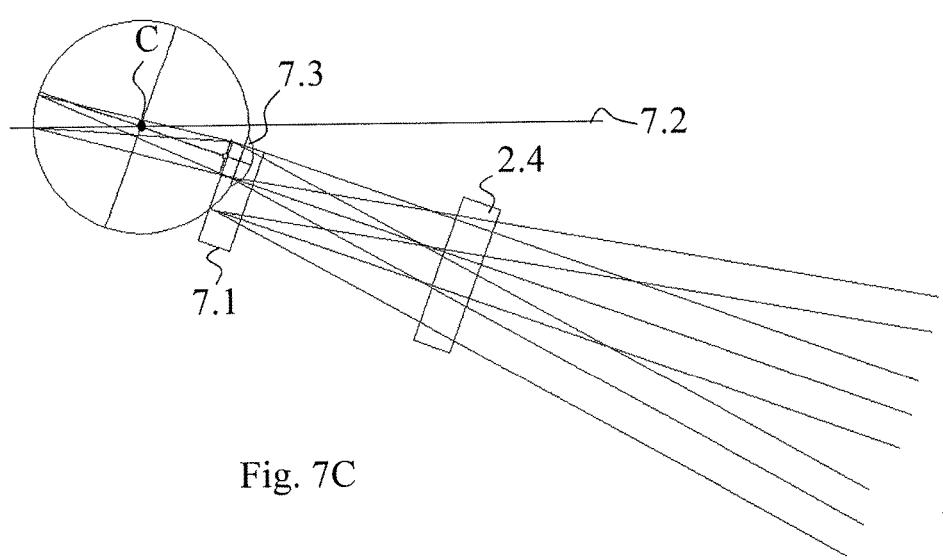
Figure 8:
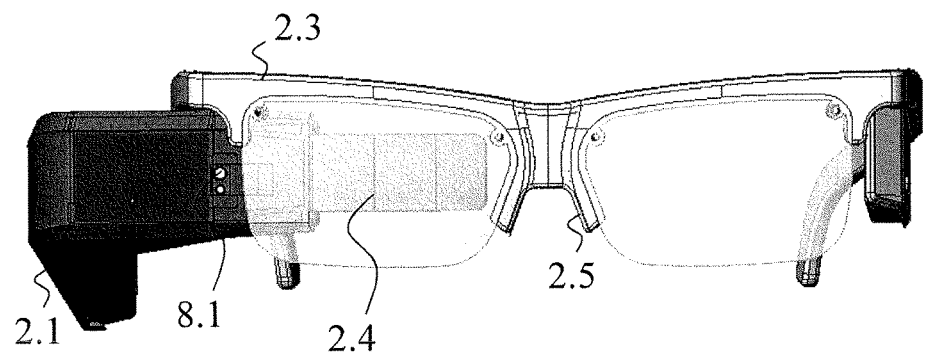
Figure 9A:
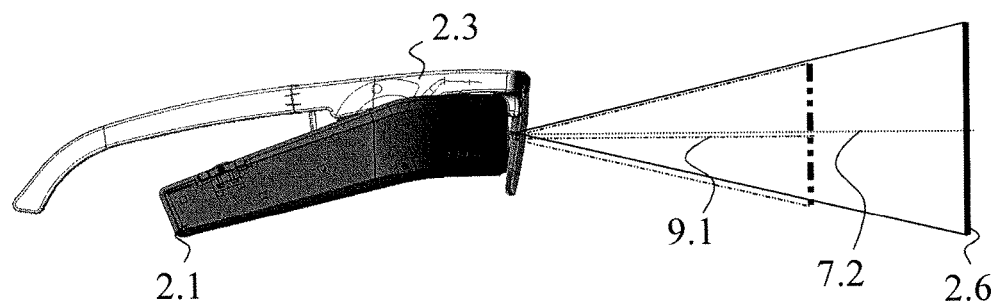
Figure 9B:
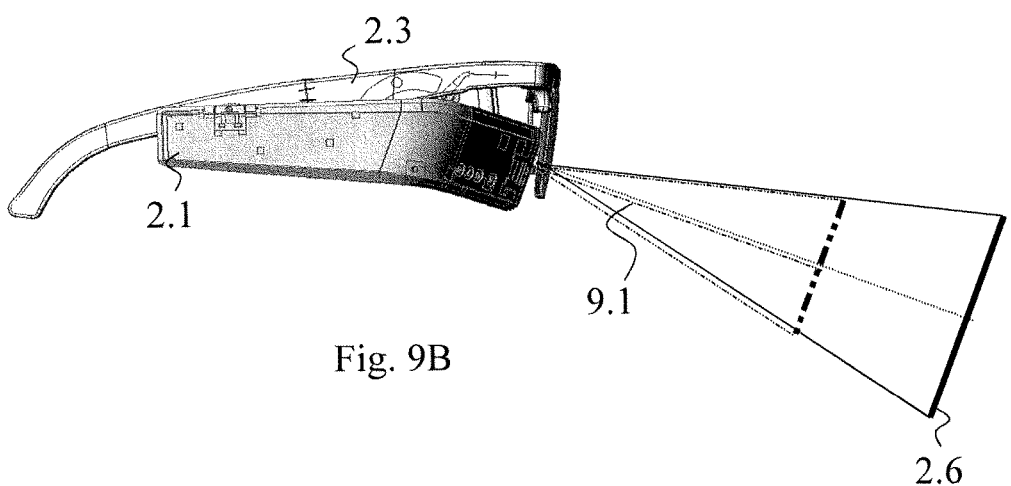
Figure 10A:
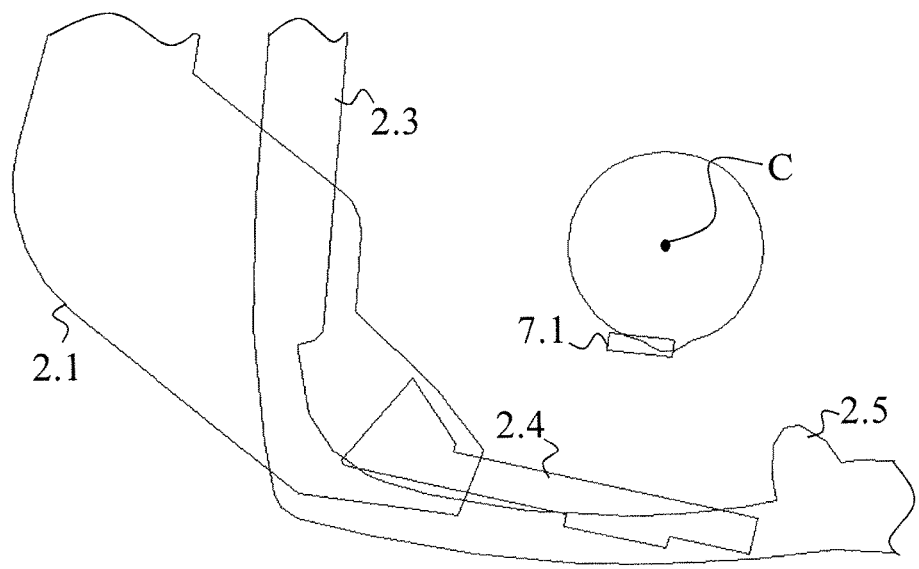

The features of the invention mentioned above, as well as others, will emerge more clearly from a reading of the following description of an example embodiment, said description being given in relation to the accompanying drawings, among which:

FIG. 1 schematically illustrates an optical guide as used in at least one embodiment of the present invention;

FIG. 2A schematically illustrates an ocular vision system in which the optical guide is placed in a first position;

FIG. 2B schematically illustrates the optical vision system in which the optical guide is placed in a second position;

FIG. 3A schematically illustrates a mechanism for adjusting a spectacle nose pad for height, in a particular embodiment of the ocular vision system;

FIG. 3B schematically illustrates another mechanism for adjusting the spectacle nose pad for height in a particular embodiment of the ocular vision system;

FIG. 4A schematically illustrates a first exploded view of a rotation mechanism of the ocular vision system, enabling the optical guide to pass from the first position to the second position and vice versa, in a particular embodiment of the ocular vision system;

FIG. 4B schematically illustrates a second exploded view of a rotation mechanism of the ocular vision system, enabling the optical guide to pass from the first position to the second position and vice versa, in a particular embodiment of the ocular vision system;

FIG. 5A schematically illustrates a first view of a spectacle sidepiece housing, for using the rotation mechanism of the ocular vision system, in a particular embodiment of the ocular vision system;

FIG. 5B schematically illustrates a second view of a spectacle sidepiece housing, for using the rotation mechanism of the ocular vision system, in a particular embodiment of the ocular vision system;

FIG. 6 schematically illustrates a fixing and guiding support forming part of the rotation mechanism of the ocular vision system in a particular embodiment of the ocular vision system;

FIG. 7A schematically illustrates a first arrangement of an eye box in the first position;

FIG. 7B schematically illustrates a second arrangement of an eye box in the second position;

FIG. 7C schematically illustrates a third eye box arrangement;

FIG. 8 schematically illustrates another ocular vision system that is equipped with an image capture device;

FIG. 9A schematically illustrates said other ocular vision system in which the optical guide is placed in the first position and the image capture device is placed in a corresponding position;

FIG. 9B schematically illustrates said other ocular vision system in which the optical guide is placed in the second position and the image capture device is placed in another corresponding position;

FIG. 10A schematically illustrates a fourth eye box arrangement; and

Figure 10B:
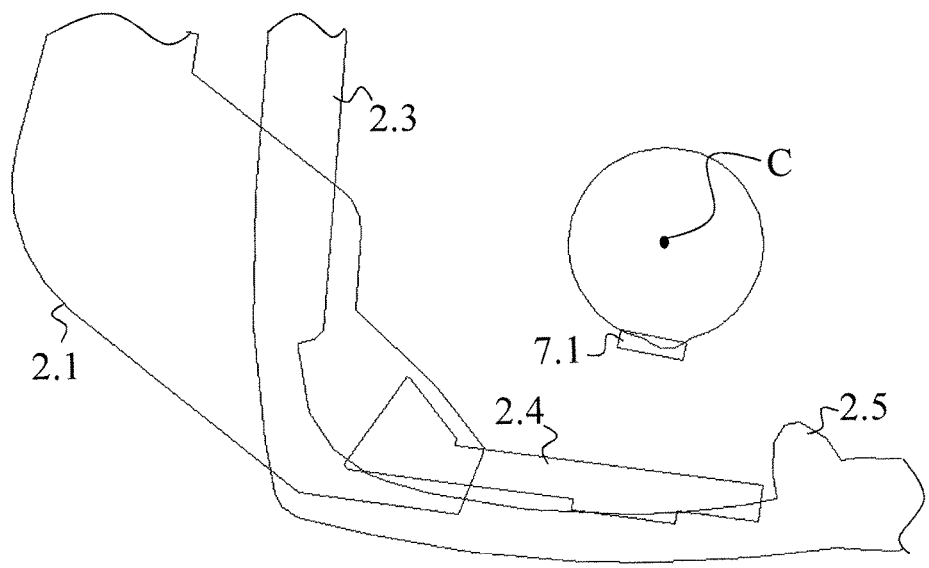

FIG. 10B schematically illustrates a fifth eye box arrangement.

The present invention consists of an ocular vision system comprising an optical guide for transporting an image without deformation and thus enabling superimposing this transported image on an external scene perceived by the eye of a user of the ocular vision system.

The invention will be described with reference to a particular embodiment where the ocular vision system is a pair of informative spectacles. The invention may however be implemented in another context, such as for example a pilot helmet or any other equipment intended to be worn fixedly with respect to the head of the user. For example, the ocular system may be an audio headset on which the optical guide is rotatably mounted.

The relative positionings of elements with respect to other elements (e.g. top, bottom, horizontal, vertical, etc.) are given considering a situation where the spectacles are worn by the user, unless mentioned to the contrary.

FIG. 1 schematically illustrates an optical guide as may be used in the ocular vision system.

The optical guide is based on the one described in the international patent application WO 2012/136470 A1, and comprises two main parts: a first part 1.5 and a second part 1.10.

The first part 1.5 enables a light beam 1.6 transporting an image (a video being a succession of images at a predefined rate) to propagate, by successive reflections, over a predefined distance. The first part 1.5 comprises an extraction section for bringing the light beam out of the optical guide once the beam has reached this predefined distance.

The second part 1.10 consists of a material substantially identical to that of said first part 1.5. The second part 1.10 is superimposed on the first part 1.5 and enables obtaining the see-through effect without any phenomenon of variation in luminance on the transparency of the optical guide.

A light source 1.1 generates the light beam transporting the image intended to pass through the optical guide. This source may consist of a matrix of LCD or LCOS pixels having backlighting or a matrix of OLED pixels.

The light beam is then collimated by an optical system 1.2. The various pixels of the image are therefore projected by a beam of parallel light rays 1.3 emerging from the optical system 1.2, and the field of vision is defined by the focal length of the lens and by the half-diagonal of the image to be transported. The collimated light beam 1.3 is then projected into an injection section 1.4 to enable the light beam to be propagated by total internal reflections in the optical guide.

The light beam is then transported in the first part 1.5 until it reaches the extraction section, from which the light beam is projected out of the optical guide. The first part 1.5 consists of a material transparent to light. If the refractive index of the material is higher than the refractive indices of the media that surround it, total internal reflections occur naturally provided that the angle of incidence of the rays of the beam, with respect to the surface on which the light beam strikes, is sufficiently small.

The extraction section is situated on one of the faces of the first part 1.5. The extraction section makes it possible to return the light beam towards the other face of the first part 1.5 at a substantially perpendicular angle, which enables the light beam 1.8 to leave the optical guide. The light beam 1.8 is thus projected out of the guidance device towards the eye of the user of the ocular vision system.

The extraction section is situated in a zone 1.7 of the optical guide, in which the first part 1.5 comprises at least one microstructure, situated on the surface and comprising a flat surface suitable for enabling the rays of the light beam that come to strike said flat surface to emerge from the optical guide. In this zone 1.7, the second part 1.10 comprises at least one microstructure with a form complementary to that or those of the first part 1.5. The microstructures that are complementary to each other are thus placed facing each other.

The first 1.5 and second 1.10 parts are assembled so that any microstructure of the extraction section is separated from its complementary microstructure by a transparent medium of substantially constant thickness. The thickness is chosen so as to imply a limited modification of the vision of the external scene. The microstructures and their complements being substantially parallel because of the substantially constant thickness of the transparent medium, the vision of the external scene is not substantially modified since the rays undergo only a small translation. Reference can be made to the patent application WO 2012/136470 A1 for more details on the implementation of these microstructures and of the injection section 1.4.

Using a plurality of such microstructures enables obtaining an eye box the length of which, in the direction of propagation of the light beam in the optical guide, is great compared with the thickness of the optical guide, in comparison with the use of a simple inclined plane (for a same thickness of the optical guide). "Eye box" means the space in which the collimated image is formed, transported by the optical guide, intended to be seen by the user. With such an approach, it is possible to obtain an eye box the length of which is around 9 mm and the height of which is around 5 mm. A typical diameter of a pupil of a human eye being around 3 to 4 mm, such an eye box enables various users with various inter-pupil distances to use the ocular vision system without having to make a horizontal adjustment of the positioning of the eye box.

It is possible to provide the ocular vision system with another type of optical guide, such as for example the one described in the patent FR 2 925 172 B1.

FIG. 2A schematically illustrates an ocular vision system in which the optical guide is placed in a first position.

In FIG. 2A, the ocular vision system is constructed on the basis of spectacles 2.3 intended to be worn by a user, whose head 2.2 is also schematically depicted in FIG. 2A. The spectacles 2.3 may be equipped with transparent, tinted or photochromic lenses. The ocular vision system comprises a display module 2.1. The display module 2.1 comprises an optical guide 2.4, as previously described in relation to FIG. 1. The display module 2.1, and consequently the optical guide 2.4, is thus rotatably mounted on the spectacles 2.3. The display module 2.1 is for example mounted, as illustrated in FIG. 2A, on the right-hand sidepiece of the spectacles 2.3. A symmetrical arrangement would enable installing the display module 2.1 on the left-hand sidepiece.

In a particular embodiment, the display module 2.1 is power-supplied thanks to a battery mounted on the other sidepiece of the spectacles 2.3, which allows distributing the weight of the ocular vision system and thus to provide better stability of the spectacles 2.3 when used and therefore better comfort for the user.

The first position of the optical guide 2.4 is such that the extraction zone of the optical guide 2.4 is substantially centred on the nominal axis of sight of the eye of the user. An optical mechanism for adjusting a nose pad 2.5 of the spectacles 2.3 for height, enabling adjusting the vertical position of the eye box with respect to the nominal axis of sight of the eye of the user, is described below in relation to FIG. 3A. An alternative optional mechanism for adjusting the nose pad 2.5 for height, enabling adjusting the vertical positioning of the eye box with respect to the nominal axis of sight of the eye of the user, is described below in relation to FIG. 3B. An optional mechanism for adjusting horizontally the optical guide 2.4, enabling adjusting the horizontal positioning of the eye box with respect to the nominal axis of sight of the eye of the user, is described below in relation to FIGS. 10A and 10B.

The first position depicted in FIG. 2A enables creating an eye box intended to completely encompass the pupil of the user. A representation of this eye box is provided in FIG. 7A, described below. The first position depicted in FIG. 2A thus enables the user to see, in a superimposed fashion, the external scene in a see-through manner and an image 2.6 transported by the optical guide 2.4. This first position is particularly suited to an augmented reality application, by the superimposition of virtual images (transported by the optical guide 2.4) on the real images (seen through the optical guide 2.4).

FIG. 2B schematically illustrates the ocular vision system of FIG. 2A, but in which the optical guide 2.4. is placed in a second position.

In FIG. 2B, the display module 2.1 is rotatably mounted, as in FIG. 2A, on the right-hand sidepiece of the spectacles 2.3.

The second position of the optical guide 2.4 is such that the extraction zone of the optical guide 2.4 is offset by a predefined angle $\alpha$ with respect to the nominal axis of sight of the eye of the user, taking as the rotation axis an axis passing substantially through the centre of rotation of the eye, i.e. the centre of the eye. In the arrangement in FIG. 2B, the rotation takes place so that the optical guide 2.4 in the first position is aligned vertically with the optical guide 2.4 in the second position. In other words, the aforementioned rotation axis is horizontal and perpendicular to the nominal axis of sight of the eye. In other arrangements, the rotation takes place so that the optical guide 2.4 in the first position is aligned horizontally with the optical guide 2.4 in the second position. In other words, the aforementioned rotation is then vertical.

The angle $\alpha$ is preferentially 20° so as to leave clear the nominal axis of sight of the eye from the presence of the optical guide 2.4. The second position is also preferentially lower than the first position. This is because looking towards the ground is more comfortable for the eye than looking upwards, and the luminosity is there typically more suitable for looking at the image transported by the optical guide 2.4. In addition, a vertical movement of the optical guide 2.4 affords a smaller space requirement than the horizontal movement of the optical guide 2.4.

The second position depicted in FIG. 2B enables creating an eye box intended to completely encompass the pupil of the user when the user offsets his axis of sight by the angle $\alpha$ downwards without moving his head. A representation of this eye box is provided in FIG. 2B, described below. The second position depicted in FIG. 2B thus enables the user to see, by lowering his eyes, the image 2.6 transported by the optical guide 2.4. This second position is particularly suited to an application of the dashboard type.

The passage from the first position to the second position of the optical guide 2.4 takes place by rotation of the display module 2.1 with respect to the spectacles frame. This rotation takes place with respect to a rotation axis passing substantially through the centre of rotation of the eye of the user. A preferential mechanism enabling fixing the display module 2.1 to the spectacles 2.3 and also enabling performing this rotation is described below in relation to FIGS. 4A, 4B, 5A, 5B and 6.

FIGS. 2A and 2B focus on the positioning of the optical guide 2.4 with respect to the spectacles frame. The ocular vision system may further comprise an image capture device, such as a video camera or a photographic apparatus. This aspect is described below in relation to FIGS. 8, 9A and 9B.

FIG. 3A schematically illustrates a mechanism for adjusting a nose pad 2.5 of the spectacles 2.3 for height. By adjusting the height of the nose pad 2.5 with respect to the frame of the spectacles 2.3, the user can ensure that his/her pupil fits in the eye box created in the first position of the optical guide, and consequently in the second position of the optical guide 2.4. The user then places the display module 2.1 so that the optical guide 2.4 is placed in the first position. The user then adjusts the height of the nose pad 2.5 with respect to the frame of the spectacles 2.3 until the image transported by the optical guide 2.4 is completely visible to the eye of the user. In other words, the user makes the vertical adjustment of the eye box. Once the adjustment of the nose pad 2.5 for height has been made for the first position of the optical guide 2.4, this adjustment remains applicable for the second position of the optical guide 2.4. This ease of adjustment stems from the fact that the rotation for passing from the first position of the optical guide 2.4 to the second position of the optical guide 2.4, and vice versa, takes place around a rotation axis passing substantially through the centre of rotation of the eye of the user. A further adjustment of the eye box would be necessary in the second position of the optical guide 2.4 if the rotation axis had been different, in particular if the rotation axis passed substantially through the focal centre of the eye.

The nose pad 2.5 is assembled with the frame of the spectacles 2.3 thanks to translational adjustment means 3.2 to enable the nose pad 2.5 to be adjusted for height. The translational adjustment means 3.2 preferentially comprise a knurled wheel 3.1 affording a fine adjustment of the height of the nose pad 2.5. The conversion of the rotation movement of the knurled wheel 3.1 into a translation movement of the nose pad 2.5 is for example achieved thanks to an assembly formed by a threaded rod, rotated by the knurled wheel 3.1, and a tapped hole formed in the nose pad 2.5. The fineness of the adjustment of the nose pad 2.5 for height then depends on the pitch of the threaded rod and of the tapped hole. These translational adjustment means 3.2 may be supplemented by translational guidance and rotational locking means 3.2 thus providing effective translation of the nose pad 2.5 by rotation of the knurled wheel 3.1. Such guidance means 3.2 for example take the form of blades inserted in slots in the nose pad 2.5.

Other forms of translational adjustment means may be implemented to adjust the height of the nose pad 2.5. Another example embodiment is shown in FIG. 3B.

FIG. 3B schematically illustrates a mechanism for adjusting the height of the nose pad 2.5. By adjusting the height of the nose pad 2.5 with respect to the frame of the spectacles 2.3, the user can ensure that his pupil fits in the eye box created in the first position of the optical guide, and consequently in the second position of the optical guide 2.4.

The nose pad 2.5 is assembled with the spectacle frame 2.3 thanks to translational adjustment means 3.4 to enable the adjustment of the height of the nose pad 2.5. The translational adjustment means 3.4 preferentially include a rack 3.5 comprising notches, each of these notches enabling placing the nose pad 2.5 at a predefined height relative to the frame of the spectacles 2.3. The fineness of the adjustment of the nose pad 2.5 for height then depends on the size of the notches on the rack 3.5.

Preferentially, the part of the nose pad 2.5 that is intended to be in abutment on the nose of the user is made from a supple material, optionally flexible, to properly match the shape of the nose.

FIGS. 4A and 4B schematically illustrate a first exploded view, and respectively a second exploded view, of a rotation mechanism of the ocular vision system, enabling the optical guide 2.4 to pass from the first position to the second position, and vice versa.

FIGS. 4A and 4B comprise schematically and partially a sidepiece 4.1 of the spectacles 2.3, on which the display module is intended to be fixed, and this in a way that is easily removable without having recourse to tools.

The sidepiece 4.1 is provided with a housing 4.2 comprising a recess 4.7 in which a stud holder 4.4 and a fixing and guiding support 4.5 are intended to be housed. A perspective view of the fixing and guiding support 4.5 is shown in FIG. 6. A perspective view of the housing 4.2 is shown in FIG. 5A. The recess 4.7 emerges on an anterior wall of the housing 4.2 as shown in FIG. 5B. In FIGS. 4A and 4B, a wall of the housing 4.2 has been disconnected from the rest of the housing 4.2 in order to facilitate identification of the parts of the rotation mechanism.

The stud holder 4.4 is secured to the sidepiece 4.1 thanks to a spring 4.3. The spring 4.3 bears for example in a first blind hole formed in the first block 4.2 and bears on the stud holder 4.4 thanks to a second blind hole formed in the stud holder 4.4 or by virtue of a shoulder in a through hole formed in the stud holder 4.4. The spring 4.3 is such that, at rest, the spring 4.3 tends to press the stud holder 4.4 on the fixing and guiding support 4.5.

The fixing and guiding support 4.5 is fixed to the display module 2.1, or forms part of the display module 2.1. The fixing and guiding support 4.5 interacts with the stud holder 4.4 to enable the display module 2.1 to be rotated with respect to the frame of the spectacles 2.3 and thus to enable the optical guide 2.4 to pass from the first position to the second position and vice versa. To do this, the stud holder 4.4 comprises at least one stud 4.9. In FIGS. 4A and 4B, the stud holder 4.4 comprises, in an illustrative fashion, two studs 4.9. Each stud 4.9 is intended to be housed in a respective oblong groove 6.1 formed in the fixing and guiding support 4.5. Each oblong groove 6.1 is such that, when the stud 4.9 that corresponds thereto is positioned at one end of said oblong groove 6.1, the optical guide is placed in the first position and, when said stud 4.9 is positioned at the other end of said oblong groove 6.1, the optical guide is placed in the second position. Each oblong groove 6.1 is in the form of an arc of a circle so that, when each stud 4.9 follows the corresponding oblong groove 6.1 from one end to the other, the optical guide 2.4 passes from the first position to the second position (or vice versa), by rotation about an axis passing substantially through the centre of the eye.

Preferentially, a blind hole 6.2 is formed at the bottom of each oblong groove 6.1, at each of its ends. This blind hole 6.2 receives the corresponding stud 4.9. Thus, when the stud 4.9 follows the oblong groove 6.1 that corresponds thereto and reaches one end of said oblong groove 6.1, said stud 4.9 enters the blind hole 6.2 under the action of the spring 4.3. By lightly forcing on the display module 2.1 during a rotation movement to pass from the first position to the second position of the optical guide 2.4, the action of the spring 4.3 is countered and said stud 4.9 disengages from the blind hole. A bevel on the end of each stud 4.9 enables disengaging said stud from said blind hole 6.2 more easily. Thus, by virtue of these blind holes 6.2, the holding in place of the display module 2.1 so that the optical guide 2.4 is in the first or second position is facilitated and improved.

The fact that the recess 4.7 is of the emerging type enables inserting the fixing and guiding support 4.5 in the housing 4.2 and to withdraw the fixing and guiding support 4.5 therefrom. This enables easily mounting the display module 2.1 on the sidepiece 4.1 of the spectacles 2.3 and to remove it easily therefrom. The mouth of the recess 4.7 is, at one point, larger to enable inserting the stud holder 4.4 and the spring 4.3 inside the housing 4.2. The spring 4.3 is then mounted on the stud holder 4.4. Compressing the spring enables making the assembly formed by the stud holder 4.4 and spring 4.3 penetrate through this widened part of the recess 4.7. Next, it suffices to slide this assembly into the recess 4.7 until the spring 4.3 comes to be positioned in the first blind hole in the housing 4.2.

A through hole 4.8 is preferentially formed in the wall of the housing 4.2 to enable fixing an actuating button 4.6 to the stud holder 4.4. The actuating button 4.6 is fixed to the stud holder 4.4 thanks to a hole 4.10 formed in the stud holder 4.4. The actuating button 4.6 then comprises a rod force-fitted in the hole 4.10. Other means for fixing the actuating button 4.6 to the stud holder 4.4 may be used, for example thanks to a thread, the actuating button 4.6 then being screwed to the stud holder 4.4. The actuating button 4.6 then enables moving the stud holder 4.4 counter to the action of the spring 4.3. By compressing the spring 4.3 while the display module 2.1 is fixed to the sidepiece 4.1, each stud 4.9 is disengaged from the corresponding oblong groove 6.1. The stud holder 4.4 and the fixing and guiding support 4.5 are then no longer interlocking in each other, and the fixing and guiding support 4.5 can then be brought out of the recess 4.7 in order to detach the display module 2.1 from the sidepiece 4.1. By compressing the spring 4.3 while the display module 2.1 is detached from the sidepiece 4.1, a space is released in the recess 4.7 to enable inserting therein the fixing and guiding support 4.5. Once the fixing and guiding support 4.5 is inserted in the recess 4.7, by releasing the spring 4.3, each stud 4.9 is engaged in the corresponding oblong groove 6.1 in order to attach the display module 2.1 to the sidepiece 4.1.

FIG. 7A schematically illustrates a first eye box arrangement in the first position of the optical guide 2.4. The first eye box arrangement corresponds to a positioning of the extraction zone of the optical guide 2.4 in the nominal axis of sight 7.2 of the eye of the user. It will then be noted that the created eye box 7.1 encompasses the pupil 7.3 of the eye. The image transported by the optical guide 2.4 is then completely visible to the eye of the user.

FIG. 7B schematically illustrates a second eye box arrangement in the second position of the optical guide 2.4.

The second eye box arrangement corresponds to an angular offset of the extraction zone of the optical guide 2.4 by 20° with respect to the nominal axis of sight 7.2 of the eye of the user, taking as the rotation axis a horizontal axis passing through the centre C of rotation of the eye, i.e. the centre C of the eye. It will then be noted that the eye box 7.1 created encompasses the pupil 7.3 of the eye. The image transported by the optical guide 2.4 is there also completely visible to the eye of the user. This figure thus demonstrates that, by performing a rotation about an axis passing substantially through the centre C of rotation of the eye, it is possible to obtain, in the second position of the optical guide 2.4, a good rendition of the image transported by the optical guide 2.4. In addition, said angular offset of 20° releases the nominal axis of sight 7.2 of the eye from the presence of the optical guide 2.4.

FIG. 7C schematically illustrates a third eye box arrangement in a third (fictitious) position of the optical guide 2.4. The third eye box arrangement also corresponds to an angular offset of the extraction zone of the optical guide 2.4 by 20° with respect to the nominal axis of sight 7.2 of the eye of the user, but taking as the rotation axis a horizontal axis passing through the focal centre F of the eye (in its position when the user is looking straight in front). It will then be noted that the created eye box 7.1 only partially encompasses the pupil 7.3 of the eye. The image transported by the optical guide 2.4 is therefore not completely visible to the eye of the user. This figure thus demonstrates that, by performing a rotation about an axis other than an axis passing substantially through the centre C of rotation of the eye, it is not possible to obtain, in this position of the optical guide 2.4, a good rendition of the image transported by the optical guide 2.4, unless the angular offset between the first position and a third position is small (less than 20°), in which case the nominal axis of sight 7.2 of the eye is partially masked by the optical guide 2.4.

FIG. 8 schematically illustrates another ocular vision system, which is equipped with an image capture device 8.1. This other ocular vision system repeats the arrangements previously described. The image capture device 8.1 is secured to the display module 2.1 and is preferentially integrated in the display module 2.1, as shown in FIG. 8. The axis of sight of the image capture device 8.1 is parallel to the axis of sight of the user when the user is looking through the optical guide 2.4. Arranging the ocular vision system so that the image capture device 8.1 is secured to the display module 2.1 enables:

when the optical guide 2.4 is in the first position, the axis of sight 9.1 of the image capture device 8.1 to be parallel to the nominal axis of sight 7.2 of the eye of the user (this arrangement is shown in FIG. 9A); and when the optical guide 2.4 is in the second position, the axis of sight 9.1 of the image capture device 8.1 to be turned on a horizontal rotation axis passing through the centre C of rotation of the eye, in the same way as the optical guide 2.4 is in the second position (this arrangement is shown in FIG. 9B).

Thus, when the display module 2.1 is positioned so that the optical guide 2.4 is in the first position, the corresponding position of the image capture device 8.1 enables performing captures of what is seen, through the optical guide 2.4, by the eye of the user at infinity. If the user is situated facing a person, this position of the image capture device 8.1 enables performing captures of pictures of the face of this person.

Thus, when the display module 2.1 is positioned so that the optical guide 2.4 is in the first position, the corresponding position of the image capture device 8.1 allows continuing to perform image captures but without images of the face of the facing person being able to be taken.

Thus, when the user is wearing the ocular vision system, the person facing is capable of determining, in the light of the position of the display module 2.1, whether pictures of his face can be captured by the image capture device 8.1. In addition, when the user is in conversation with said person, it is more comfortable for the user to place the optical guide 2.4 in the second position in order to avoid having to look at said person through the optical guide 2.4.

The image capture device 8.1 can be of the same type as those used in current Smartphones without a focusing device, with a predefined depth of field. This allows obtaining a compact display module despite the presence of the image capture device 8.1.

In a particular embodiment, the display module 2.1 comprises at least one position sensor for detecting when the optical guide 2.4 is in the first position and/or when the optical guide 2.4 is in the second position. The stud holder 4.4 and the fixing and guiding support 4.5 can be adapted to install said position sensor or sensors. This or these position sensor(s) can be associated with at least one indicator light, a first state of which represents the optical guide 2.4 in the first position and the second state of which represents the optical guide 2.4 in the second position. This or these indicator light(s) can then be used by the person facing the user wearing the ocular vision system in order to determine whether the image capture device 8.1 is in a position enabling capturing pictures of the face of said person.

In a particular embodiment, the display module 2.1 comprises at least one said position sensor and further comprises communication means, preferably wireless, for communicating directly or indirectly with a processing server. The communication means are adapted for enabling the ocular vision system to transmit to said server information representing the position in which the optical guide 2.4 is situated, as obtained from indications given by said position sensor or sensors. The communication means are adapted for enabling the ocular vision system to transmit to said server images captured by the image capture device 8.1 and to receive from said server the images to be propagated via the optical guide 2.4. The processing server can then apply processing to the captured images, received from the ocular vision system, depending on the position of the optical guide 2.4. For example the image capture device 8.1 is a video camera and the processing server is adapted for: applying processing for applying augmented reality to the images received from the ocular vision system when the optical guide 2.4 is in the first position; and applying processing for applying gesture recognition to the images received from the ocular vision system when the optical guide 2.4 is in the second position. The augmented reality application enables for example recognising an environment of the user, thanks to a comparison of the images received from the ocular vision system with data representing an environment that are known and stored in a database accessible to said server. The processing server can then transmit to the ocular vision system, for display via the optical guide 2.4, items of information relating to the recognised environment that are contained in the database. Applying gesture recognition enables the user to control, by hand gestures, the ocular vision system and/or a device ancillary to the ocular vision system and/or a third-party device connected, directly or indirectly, to the processing server thanks to a comparison of the images received from the ocular vision system with data representing predefined gestures stored in an accessible database of said server. Indeed, it is more comfortable for the user to control the gestures made with the hands by putting the optical guide 2.4 in the second position, since the hands are naturally situated below the nominal axis of sight 7.2 of the eye of the user.

To carry out data processing operations, such as for example processing operations with a view to exchanging data with said processing server, the display module 2.1 may comprise, connected by a communication bus: a processor or CPU (central processing unit); a random access memory RAM; a read only memory ROM; a storage unit or a storage medium reader, such as an SD (secure digital) card reader; and a communication interface for exchanging data. The processor is capable of executing instructions loaded in the RAM from the ROM, from an external memory (not shown), from a storage medium or from a communications network. When the display module 2.1 is powered up, the processor is capable of reading instructions from the RAM and executing them. These instructions form a computer program causing all or some of said processing operations to be implemented by the processor.

Thus all or some of said processing operations can be implemented in software form by the execution of a set of instructions by a programmable machine, such as a DSP (digital signal processor) or a microcontroller, or be implemented in hardware form by a machine or a dedicated component such as an FPGA (field-programmable gate array) or an ASIC (application-specific integrated circuit).

FIG. 10A schematically illustrates a fourth eye box arrangement. FIG. 10A is a partial schematic plan view, in transparency, of the ocular vision system. FIG. 10A shows the arrangement in which the eye box 7.1 does not encompass the pupil of the eye. The user then only has a partial view of the image propagated in the optical guide 2.4.

In this embodiment, the display module 2.1 comprises supplementary means for rotating the optical guide 2.4 in order to allow a horizontal adjustment of the eye box. By adjusting the position of the optical guide 2.4 horizontally, the user can ensure that his pupil fits within the created eye box in the first position of the optical guide 2.4, and consequently in the second position of the optical guide 2.4. The user then places the display module 2.1 so that the optical guide 2.4 is placed in the first position. The user then adjusts the optical guide 2.4 horizontally, by rotation by virtue of said supplementary means, until the image transported by the optical guide 2.4 is completely visible to the eye of the user (as shown in FIG. 10B). Once the horizontal adjustment of the optical guide 2.4 has been carried out for the first position of the optical guide 2.4, this adjustment remains applicable for the second position of the optical guide 2.4. The optical guide 2.4 is rotated about a vertical axis, preferentially passing through the injection section 1.4 of the optical guide 2.4. In a particular embodiment, this vertical axis passes substantially through the barycentre of the injection section 1.4.

The supplementary rotation means are arranged to preferentially allow a movement of the optical guide 2.4 of $\pm 10°$. A refinement of the horizontal position of the optical guide 2.4 of around $\pm 2°$ may however prove to be sufficient in the majority of cases.

FIG. 10B therefore schematically illustrates a fifth eye box arrangement. FIG. 10B is also a partial schematic plan view, in transparency, of the ocular vision system. FIG. 10B shows an arrangement in which the eye box 7.1 encompasses the pupil of the eye. The optical guide 2.4 is offset horizontally therein by an angle of 5° with respect to the positioning of the optical guide 2.4 in FIG. 10A. The fifth eye box arrangement corresponds to a positioning of the extraction zone of the optical guide 2.4 in the nominal axis of sight 7.2 of the eye of the user, after horizontal adjustment of the optical guide 2.4 with respect to the fourth arrangement in FIG. 4. The image transported by the optical guide 2.4 is then completely visible to the eye of the user, in the nominal axis of sight 7.2 of the eye of the user.

The supplementary rotation means are thus adapted to enable adjusting the extraction zone horizontally with respect to the nominal axis of sight 7.2 of the eye of the user when the optical guide 2.4 is in the first position.

The invention claimed is:

1. An ocular vision system intended to be worn by a user, said system comprising a display module, the display module comprising a transparent optical guide arranged to propagate, by total internal reflections, a light beam transporting an image as far as an extraction section of said optical guide, comprising:
   a stud holder comprising at least one stud; and
   a fixing and guiding support comprising at least one oblong grove arranged to receive said stud, the stud holder interacting with the fixing and guiding support
   (1) for positioning the optical guide in a first position in which the extraction section is placed on a first axis corresponding to a nominal axis of sight of the eye of the user,
   (2) for positioning the optical guide in a second position in which the extraction section is placed on a second axis offset with respect to the nominal axis of sight of the eye of the user,
   and (3) for rotating the optical guide and being adapted for enabling the optical guide to pass from the first position to the second position and vice versa;
   wherein the stud holder and the fixing and guiding support are arranged to perform the rotation about an axis intended to pass substantially through the centre of rotation of the eye of the user,
   and wherein,
   each groove being such that, when said stud is placed at one end of said groove, the optical guide is in the first position and, when said stud is placed at the other end of said groove, the optical guide is in the second position.

2. The ocular vision system according to claim 1, wherein the second axis is offset by 20° with respect to the nominal axis of sight of the eye of the user.

3. The ocular vision system according to claim 1, wherein, said system being spectacles, the display module being fixed to one of the sidepieces of said spectacles, the system further comprises a height-adjuster for adjusting a nose pad of said spectacles for height.

4. The ocular vision system according to claim 3, wherein said height-adjuster comprise a knurled wheel and an assembly formed by a threaded rod, rotated by the knurled wheel, and a tapped hole formed in the nose pad for converting a rotation movement of the knurled wheel into a translation movement of the nose pad.

5. The ocular vision system according to claim 3, wherein said height-adjuster comprises a rack composed of notches, each of the notches defining a predefined height of the nose pad.

6. The ocular vision system according to claim 1, wherein said system being spectacles, the display module being fixed to one of the sidepieces of said spectacles, said system further comprises a battery fixed to the other sidepiece of said spectacles.

7. The ocular vision system according to claim 1, further comprising a spring for ensuring engagement of each stud in one corresponding said oblong groove, and in that each oblong groove comprises, at each of its ends, a blind hole arranged to receive one corresponding said stud under the action of said spring.

8. The ocular vision system according to claim 1, wherein said system further comprises an actuation button fixed to the stud holder and adapted for countering the action of the spring for disengaging each stud from the corresponding oblong groove.

9. The ocular vision system according to claim 1, wherein said system further comprises a housing in which a recess is formed, the recess being arranged to receive the stud holder and the fixing and guiding support, the mouth of the recess comprising, at one point, a larger part to enable inserting the stud holder and spring in said housing.

10. The ocular vision system according to claim 1, wherein an image capture device is mounted fixedly on the display module so that the axis of sight of said image capture device is parallel to the axis of sight of the user when the user is looking through the optical guide.

11. The ocular vision system according to claim 10, further comprising at least one position sensor for detecting when the optical guide is in the first position and/or when the optical guide is in the second position.

12. The ocular vision system according to claim 11, further comprising at least one indicator light, associated with said position sensor or sensors, a first state of which represents the optical guide in the first position and a second state of which represents the optical guide in the second position.

13. The ocular vision system according to claim 11, further comprising communication interface arranged for transmitting to a server images captured with said image capture device and information representing the position of said optical guide detected by said sensor or sensors and for receiving from the server the image to be transported by the optical guide.

14. The ocular vision system according to claim 13, wherein, said image capture device being a video camera, said server is arranged to:
  apply an augmented reality application processing to the images received from the ocular vision system, when the optical guide is in the first position; and
  apply a gesture recognition application processing to the images received from the ocular vision system, when the optical guide is in the second position.

15. The ocular vision system according to claim 1, the ocular vision system is further adapted to adjust the extraction section horizontally with respect to the nominal axis of sight of the eye of the user, when the optical guide is in the first position.

16. The ocular vision system according to claim 12, further comprising a communication interface arranged for transmitting to a server images captured with said image capture device and information representing the position of said optical guide detected by said sensor or sensors and for receiving from the server the image to be transported by the optical guide.

17. The ocular vision system according to claim 16, wherein, said image capture device being a video camera, said server is arranged to:
  apply an augmented reality application processing to the images received from the ocular vision system, when the optical guide is in the first position; and
  apply a gesture recognition application processing to the images received from the ocular vision system, when the optical guide is in the second position.

* * * * *